United States Patent [19]

Nakanishi et al.

[11] Patent Number: 4,703,979
[45] Date of Patent: Nov. 3, 1987

[54] ANTI-SKID PRESSURE CONTROL DEVICE IN HYDRAULIC BRAKING SYSTEM

[75] Inventors: Nobuyasu Nakanishi; Yoshihisa Nomura, both of Toyota, Japan

[73] Assignee: Toyota Jidosha Kabushiki Kaisha, Aichi, Japan

[21] Appl. No.: 764,219

[22] Filed: Aug. 9, 1985

[30] Foreign Application Priority Data

Aug. 14, 1984 [JP] Japan .................. 59-124462[U]
Aug. 15, 1984 [JP] Japan .................. 59-170723

[51] Int. Cl.⁴ .................................. B60T 8/02
[52] U.S. Cl. .................................. 303/116; 303/119; 188/181 A
[58] Field of Search .............. 303/113, 116, 119; 188/181 A

[56] References Cited

U.S. PATENT DOCUMENTS 4,421,361  12/1983  Arikawa et al. ............ 303/116 X
4,453,782  6/1984   Arikawa et al. ............ 303/116

FOREIGN PATENT DOCUMENTS

56-128251  7/1981  Japan .

Primary Examiner—Duane A. Reger
Assistant Examiner—Matthew C. Graham
Attorney, Agent, or Firm—Kenyon & Kenyon

[57] ABSTRACT

An anti-skid pressure control device of a hydraulic braking system, comprising: a solenoid valve for selective communication of a master cylinder with a brake cylinder to apply a brake or with a reservoir to bleed the brake cylinder; a pump for returning a fluid from the reservoir to a passage between the master cylinder and the solenoid valve; a shut-off valve to prevent a fluid flow from the pump toward the master cylinder; and a relief valve for returning the fluid from the pump to the master cylinder. The relief valve includes: a housing having a valve chamber, a first port connected to the pump, and a second port communicating the valve chamber and the master cylinder; valve seat adjacent to the firstport; a valve member disposed in the valve chamber such that it may be seated on the valve seat; a piston slidably supported in the housing so as to force the valve member against the valve seat, the piston receiving at its one end a pressure in the valve chamber and at the other end an atmospheric pressure; and a spring for biasing the piston and the valve member toward the valve seat.

6 Claims, 2 Drawing Figures

ANTI-SKID PRESSURE CONTROL DEVICE IN HYDRAULIC BRAKING SYSTEM

BACKGROUND OF THE INVENTION

1. Field of the Art

The present invention relates in general to an anti-skid pressure control device to control a braking pressure in brake cylinders in a hydraulic braking system for an automotive vehicle, in order to prevent an excessive slip of drive wheels of the vehicle on the road surface upon brake application. More particularly, the invention is concerned with a relief valve used in such an anti-skid pressure control device.

2. Related Art Statement

An example of such a hydraulic braking system for an automotive vehicle is known, according to Japanese Patent Application laid open in 1981 under Publication No. 56-128251, which comprises: (a) a reservoir having a housing, and a piston received in the housing slidably movably over a limited distance and cooperating with the housing to define a fluid chamber of a variable volume in which a brake fluid is stored; (b) a solenoid valve disposed in a primary fluid passage connecting a master cylinder and a brake cylinder to feed the brake fluid from the master cylinder to the brake cylinder, the solenoid valve being selectively placed in one of a first operating position for communication of the brake cylinder with the master cylinder, and a second operating position for communication of the brake cylinder with the reservoir; (c) a controller for monitoring an amount of slip of a drive wheel of a vehicle on the road surface, and controlling the solenoid valve so as to control the braking pressure in the brake cylinder at an optimum level; (d) a pump for pumping the brake fluid from the reservoir and returning the pumped fluid via a pump passage to the primary fluid passage at a point thereof between the master cylinder and the solenoid valve; (e) a shut-off valve in a portion of the primary fluid passage between the master cylinder and the above-identified point, the shut-off valve being closed to prevent a flow of the brake fluid from the pump passage toward the master cylinder at least while the brake fluid is being fed by the pump; (f) and a relief valve disposed between the outlet of the pump and the reservoir, to permit the brake fluid from the pump to be returned into the reservoir when the delivery pressure of the pump exceeds a preset level.

The hydraulic braking system with the anti-skid pressure control device constructed as described above, does not suffer a so-called "kick-back" phenomenon of a brake pedal or similar manually-operated member, which is conventionally encountered due to a return flow of the brake fluid from the pump back into the master cylinder via the primary fluid passage. The elimination of the "kick-back" phenomenon leads to an improved operating feel of the brake pedal.

In the hydraulic braking system of the type indicated above, however, the reservoir may be filled with the brake fluid, i.e., the brake fluid from the brake cylinder may fill the maximum volume of the fluid storage chamber of the reservoir with its piston located at its stroke end. In this condition, the reservoir is not more able to accommodate the brake fluid from the brake cylinder, causing the anti-skid pressure control device to fail to effect an intended control of the braking pressure in the brake cylinder. For instance, the reservoir will be filled when a leakage flow occurs in the solenoid valve while a braking pressure is applied to the brake cylinder repeatedly or intermittently for repeated brake application without an anti-skid pressure control. In this event, the leakage flow from the solenoid valve fills the reservoir. The reservoir may be filled, also when the brake fluid is discharged from the brake cylinder as a result of an anti-skid pressure control of the brake cylinder, and the discharged fluid is fed into the reservoir in a partially-filled condition.

To solve the above-indicated inconveniences, the assignee of the present application proposed a solution which is disclosed in Japanese Patent Application No. 59-64269 (filed in 1984), wherein a second relief valve is disposed between the outlet side of the pump and the master cylinder, in addition to the previously indicated relief valve (referred to as first relief valve). Further, the proposed solution uses an arrangement in which the piston of the reservoir has a predetermined intermediate position part way through its full stroke, in which the volume of the fluid storage chamber of the reservoir is smaller by a given amount than its maximum volume corresponding to the stroke end position of the piston. The reservoir has means for restricting or completely blocking a flow of the brake fluid from the pump into the reservoir via the first relief valve when the reservoir piston is placed in the intermediate position.

In the proposed arrangement, the intermediate volume of the storage chamber of the reservoir corresponding to the intermediate position of the piston may be filled with the brake fluid upon leakage flow of the fluid from the solenoid valve, for example. However, the storage chamber will not be filled with the brake fluid discharged from the brake cylinder during an anti-skid pressure control operation, because the discharged brake fluid is returned to the master cylinder via the second relief valve. Thus, the proposed arrangement is free from the previously indicated problem that the reservoir may be filled and unable to accommodate the brake fluid discharged from the brake cylinder. Thus, the proposed anti-skid pressure control device is improved in operating reliability.

In the meantime, however, there is another problem in connection with the proposed anti-skid pressure control device. Stated more particularly, the second relief valve, which permits a return flow of the fluid from the pump passage into the master cylinder, is opened while a braking pressure is applied to the brake cylinder. Therefore, the braking pressure exists in the master cylinder when the second relief valve is opened. Accordingly, the pressure at which the second relief valve is opened is affected by the master cylinder pressure. Namely, the maximum pressure in the pump passage is affected by the maximum braking pressure generated by the master cylinder. In an ordinary relief valve, its valve member is forced against the valve seat not only by a biasing spring but also by a pressure in the valve chamber in which the valve member is accommodated. In this arrangement, the relief valve will not be opened until the pressure in the pump passage has been elevated to a level which is high enough to overcome the biasing force of the spring and the pressure in the valve chamber (viz., master cylinder pressure). Moreover, the first relief valve is usually designed to be opened at a pressure which is not lower than the maximum braking pressure generated in the master cylinder. On the other hand, the second relief valve is designed to be opened at a pressure higher than the opening pressure of the first relief valve, even while the master cylinder pressure is considerably low. Hence, when the master cylinder pressure is high, the second relief valve will be open only when the pressure in the pump passage is extremely high. Accordingly, the pump, master cylinder, shut-off valve, piping system, etc. must be designed so as to withstand a very high pressure, which leads to increased weight and cost of the braking system. Further, such a very high flud pressure will be applied to the master cylinder when the second relief valve is open, and will cause a "kick-back" trouble with the brake pedal. Although this "kick-back" phenomenon will happen very infrequently and give substantially no effect on the operating feel of the brake pedal, the occurrence of such an infrequent "kick-back" phenomenon may make the vehicle driver feel uneasy about the reliabilty of the braking system, particularly when the kick-back motion is large. For this reason, it is desired to minimize the kick-back phenomenon caused by the fluid return into the master cylinder.

SUMMARY OF THE INVENTION

It is accordingly an object of the present invention to provide an anti-skid pressure control device of a hydraulic braking system, which does not suffer the conventionally experienced inconveniences that the master cylinder pressure will affect the pressure at which the relief valve between the pump and the master cylinder is opened.

According to the present invention, there is provided an anti-skid pressure control device of a hydraulic braking system for an automotive vehicle, comprising: a reservoir for storing a brake fluid which is discharged from a brake cylinder to reduce a braking pressure in the brake cylinder; a solenoid valve disposed in a primary fluid passage of the braking system which connects a master cylinder and the brake cylinder to feed the brake fluid from the master cylinder to the brake cylinder to apply a brake to a drive wheel of the vehicle, the solenoid valve being selectively placed in one of a first position for communication of the brake cylinder with the master cylinder, and a second position for communication of the brake cylinder with the reservoir, the solenoid valve being switched between the first and second positions under the control of a controller to control a level of a braking pressure in the brake cylinder; a pump for pumping the brake fluid from the reservoir and returning the pumped fluid via a pump passage to the primary fluid passage at a point thereof between the master cylinder and the solenoid valve; a shut-off valve disposed in a portion of the primary fluid passage between the master cylinder and the above-identified point, the shut-off valve being closed to prevent a flow of the brake fluid therethrough in a direction from the pump toward the master cylinder at least in a condition where the brake fluid is fed via the pump passage to the shut-off valve; and a relief valve for returning the brake fluid from the pump passage to the master cylinder when a pressure in the pump passage is higher than a preset level, the relief valve comprising: (a) a relief valve housing having a valve chamber, a first port communicating with the valve chamber and a pump passage connected the pump, and a second port communicating with the valve chamber and the master cylinder; (b) a valve seat formed so as to define a part of the valve chamber adjacent to the first port; (c) a valve member accommodated in the valve chamber such that the valve member may be seated on the valve seat; (d) a relief valve piston slidably and fluid-tightly supported in the relief valve housing, such that the relief valve piston is opposite to the valve seat, with the valve member disposed therebetween, the relief valve piston receiving at one end thereof a pressure in the valve chamber, and at the other end an atmospheric pressure; and (e) relief valve biasing means for biasing the relief valve piston in a direction that causes the relief valve piston to abut on the relief valve member for forcing the relief valve member against the valve seat.

In the anti-skid pressure control device of the invention constructed as described above, the valve member of the relief valve for returning the brake fluid from the pump passage to the master cylinder is biased by the biasing means, whose biasing force is transmitted to the valve member via the relief valve piston which receives the pressure in the valve chamber. This pressure acts on the relief valve piston in a direction that causes the relief valve piston to move against the biasing force of the biasing means. In the instant arrangement of the relief valve, the pressure in the valve chamber, i.e., the master cylinder pressure will have a reduced influence on the pressure of the relief valve at which it is opened.

More specifically, an increase in the master cylinder pressure provides an increase in the pressure in the relief valve chamber, which acts to force the relief valve member against the relief valve seat. At the same time, the increase in the pressure in the relief valve chamber provides an increase in the force which is exerted on the relief valve piston. Accordingly, the biasing force of the biasing means exerted on the relief valve member via the piston is reduced, whereby the master cylinder pressure has a reduced effect on the pressure required for opening the relief valve.

As a result, the relief valve is opened at a relatively low pressure even when the master cylinder pressure is relatively high. Hence, the pressure in the pump passage may be held below a comparatively low level. This means that the pump and other components of the system may be designed with a relatively low strength to the fluid pressure, which leads to reduced weight and cost of the anti-skid pressure control device of the braking system.

Further, the pressure of the brake fluid to be returned to the master cylinder via the relief valve is relatively low, and the kick-back motion of the brake pedal or similar brake control member is held to a minimum.

According to an advantageous embodiment of the invention, a pressure receiving area of the valve member of the relief valve while the valve member is seated on the valve seat is equal to that of the piston at its one end on the side of the relief valve chamber. In this instance, the influence of the master cylinder pressure on the relief valve opening pressure is completely eliminated, that is, the pressure at which the relief valve member is moved away from the relief valve seat is constant, irrespective of the master cylinder pressure.

According to another embodiment of the invention, an end portion including the other end of the relief valve piston has a larger diameter than other portions thereof. In this case, the biasing means bears at its one end on this large-diameter end portion of the relief valve piston.

The relief valve housing may further has a third port communicating with the second port and the shut-off valve. Thus, the relief valve housing having the first, second and third ports serves as a Tee-joint connecting the master cylinder, the pump passage and the shut-off valve.

In a preferred form of the relief valve, the relief valve piston is disposed such that its axis is aligned with a center of the valve seat.

In accordance with a further advantageous embodiment of the invention, the reservoir comprises: (a) a rservoir housing; (b) a reservoir piston fluid-tightly received in the reservoir housing slidably movably over a predetermined distance, and cooperating with the reservoir housing to define a fluid chamber of a variable volume in which the brake fluid is stored, the volume of the fluid chamber being increased toward a maximum volume when the reservoir piston is moved in one direction; (c) a valve spool slidably fitted in a valve hole formed in the reservoir housing, the valve spool being movable parallel to a line of movement of the reservoir piston, between an open position in which the fluid chamber is in communication with the pump passage, and a closed position in which the fluid chamber is disconnected from the pump passage; and (d) spool biasing means for biasing the valve spool toward its open position, in a direction opposite to said one direction of movement of the reservoir piston. The reservoir piston has a first engagement portion, and the valve spool has a second engagement portion which engages the first engagement portion of the reservoir piston when the reservoir piston has been moved to an intermediate position at which the volume of the fluid chamber is smaller by a predetermined amount than the maximum volume. The valve spool is moved toward the closed position together with the reservoir piston after the reservoir piston has been moved to the intermediate position.

BRIEF DESCRIPTION OF THE DRAWING

The foregoing and other objects, features and advantages of the present invention will be better understood from reading the following detailed description of preferred embodiments of the invention, when considered in connection with the accompanying drawing, in which.

DETAILED DESCRIPTION OF THE PREFERRED EMBODIMENTS

Figure 1:
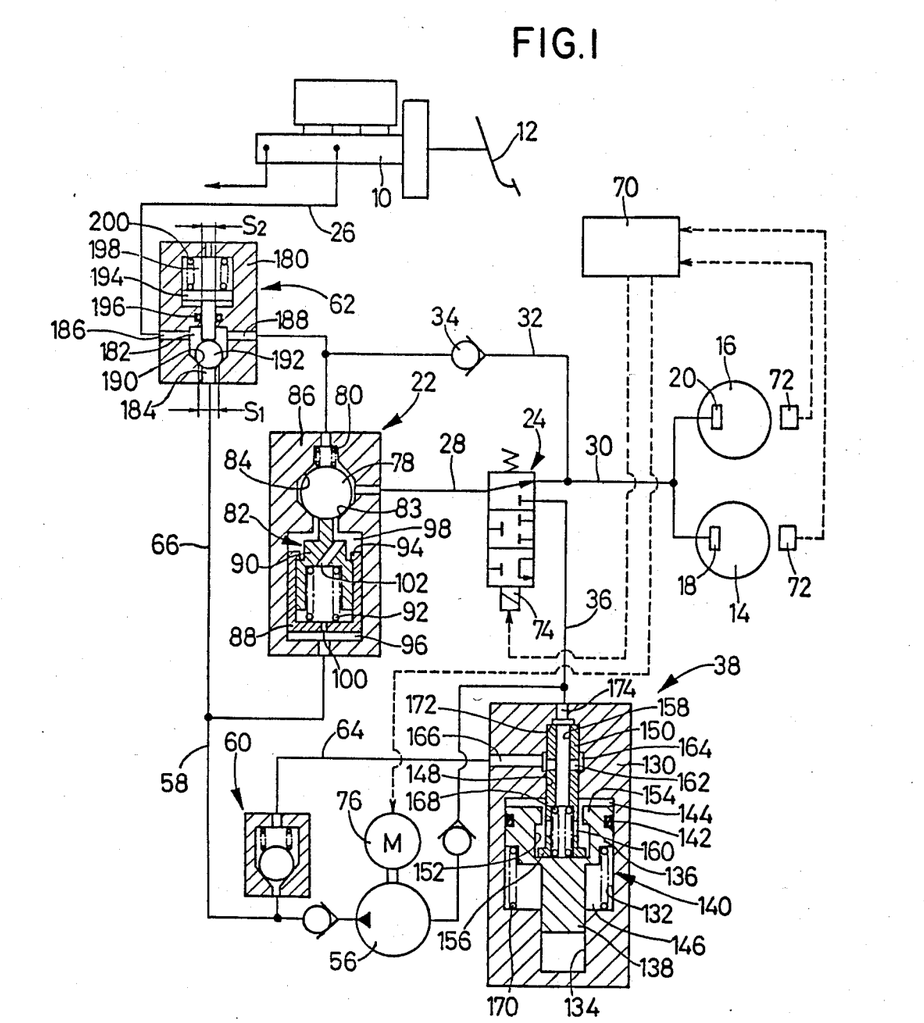
FIG. 1 is a fragmentary schematic circuit diagram of one embodiment of a hydraulic anti-skid braking system of the invention for a four-wheel automotive vehicle, which incorporates a relief valve.

Referring to FIG. 1, there will be described in detail a preferred embodiment of an anti-skid pressure control device of a hydraulic braking system for a four-wheel automotive vehicle.

In the figure, reference numeral 10 designates a master cylinder having two mutually independent pressure chambers in which fluid pressures of the same level are generated upon depression of a brake pedal 12. The braking pressure developed in one of the two pressure chambers in the master cylinder 10 is aplied to brake cylinders 18, 20 of wheel brakes of drum, disc or other types provided for right and left rear drive wheels 14, 16 of the vehicle. In the meantime, the braking pressure in the other pressure chamber of the master cylinder 10 is applied to brake cylinders (not shown) for front drive wheels (not shown) of the vehicle. Thus, the instant braking system has two independent braking circuits for the rear and front drive wheels. In the interest of brevity and simplification, only the rear braking circuit will be described.

The master cylinder 10 is connected to the brake cylinders 18, 20 through a primary fluid passage in which there are disposed a selector valve 22 and a solenoid valve 24. These two valves 22, 24 divide the primary fluid passage into three parts: a master-cylinder passage 26 communicating with the master cylinder 10 and the selector valve 22; an intermediate passage 28 communicating with the selector valve 22 and the solenoid valve 24; and a brake-cylinder passage 30 communicating with the solenoid valve 24 and the brake cylinders 18, 20. The master-cylinder passage 26 and the brake-cylinder passage 30 are connected by a by-pass passage 32 which by-passes the selector and solenoid valves 22, 24. In this by-pass passage 32, there is provided a check valve 34 which allows a flow of the brake fluid only in one direction from the brake-cylinder passage 30 (brake cylinders 18, 20) toward the master-cylinder passage 26 (master cylinder 10).

The solenoid valve 24 is connected to a reservoir 38 through a reservoir passage 36. The brake fluid reserved in this reservoir 38 is pumped out by a pump 56, and delivered to the previously indicated intermediate passage 28 via a pump passage 58 and the selector valve 22.

The pump passage 58 is connected to a first relief passage 64 having a first relief valve 60, and to a second relief passage 66 having a second relief valve 62. The first relief valve 60 permits the brake fluid in the pump passage to be fed to the reservoir 38 when the pressure in the pump passage 58 exceeds a preset level. In the meantime, the second relief valve 62 permits the brake fluid in the pump passage 58 to be returned to the master cylinder 10 via the master-cylinder passage 26. This second relief valve 62 is adapted to be open at a preset pressure higher than that of the first relief valve 60.

While the hydraulic braking system has been outlined, the construction and operation of the solenoid valve 24, selector valve 22, reservoir 38 and relief valve 62 will be described in this order.

The solenoid valve 24 is selectively placed in one of first, second and third operating positions which are hereinafter referred to as "PRESSURE RISE", "PRESSURE HOLD" and "PRESSURE DROP" positions. In the first or PRESSURE RISE position, the intermediate passage 28 is held in communication with the brake-cylinder passage 30, as shown in FIG. 1. Thus, the solenoid valve 24 in the PRESSURE RISE position permits the braking pressure in the brake cylinders 18, 20 to rise with the brake fluid delivered to the intermediate passage 28 from the master cylinder 10 or the pump 56. In the second or PRESSURE HOLD position, all of the intermediate passage 28, brake-cylinder passage 30 and reservoir passage 36 are closed by the solenoid valve 24, whereby the braking pressure in the brake cylinders 18, 20 is maintained at a fixed level. In the third or PRESSURE DROP position, the brake-cylinder passage 30 is held in communication with the reservoir passage 36. Thus, the solenoid valve 24 in its PRESSURE DROP position permits the braking pressure in the brake cylinders 18, 20 to drop or fall with the brake fluid discharged from the brake cylinders 18, 20 to the reservoir 38.

The solenoid valve 24 is operated under control of a controller 70, a substantive part of which is a microcomputer. The controller 70 receives SPEED signals from speed sensors 72 which sense rotating speeds of the rear drive wheels 14, 16. Based on the SPEED signals, the controller 70 determines a degree of slip of the rear drive wheels 14, 16 on the road surface, and controls an electric current to be applied to a solenoid 74 of the solenoid valve 24, depending upon the determined degree of slip of the wheels 14, 16. In this manner, the solenoid valve 24 is placed selectively in one of its three operating positions previously discussed. Since this manner of controlling a solenoid valve is known in the art, and since the manner of controlling the solenoid valve 24 by the controller 70 is not important for understanding the concept of the present invention, no further description will be provided herein in this connection.

The controller 70 is adapted to also control a pump motor 76 which drives the pump 56. Described more specifically, the pump motor 76 is controlled by the controller 70 so as to start a pumping action of the pump 56 when an anti-skid control of the braking pressure in the brake cylinders 18, 20 is started. That is, the pump motor 76 is started when the solenoid valve 24 is shifted from its PRESSURE RISE position to its PRESSURE HOLD or PRESSURE DROP position, for the first time. The pump 56 is held operated by the motor 76 as long as the anti-skid control of the braking pressure continues.

The selector valve 22 is selectively placed in one of two operating positions: a first position in which the intermediate passage 28 is held in communication with the master-cylinder passage 26; and a second position in which the intermediate passage 28 is in communication with the pump passage 58. This selective communication of the intermediate passage 28 with the master-cylinder and pump passages 26, 58 is effected by means of movement of a shut-off valve member 78. This valve member 78 is biased by a spring 80 so that the valve member 78 is held seated on a shut-off valve seat 83, i.e., placed in the first position for fluid communication between the master-cylinder passage 26 and the intermediate passage 28, and for non-communication of the intermidiate passage 28 with the pump passage 58. The valve member 78 is moved against a biasing force of the spring 80 by a shut-off valve piston 82 to its second position for closing the master-cylinder passage 26 with respect to the intermediate passage 28, and for fluid communication of the intermediate and pump passages 28, 58. The shut-off valve piston 82 consists of a cup-shaped first member 88 slidably received in a selector valve housing 86, and a second member 90 slidably received in the first member 88. The second member 80 is biased by a spring 92 in a direction in which the second member 90 is moved away from the first member 88 by the spring 92. The first member has at its one end a stopper 94 which is formed for abutting contact with a mating surface of the second member 90, so that an axial distance of projection of the second member 90 from the first member 88 is limited. Since the biasing force of the spring 92 is greater than that of the spring 80 biasing the valve member 78, the second member 90 is normally held in an abutting engagement with the stopper 94 of the first member 88, and the valve member 78 is held seated on the valve seat 83. In this condition, the valve member 78 and the piston 82 are located a maximum distance away from the valve seat 84.

The piston 82 fluid-tightly engaging the housing 86 divides a space within the housing 86 into a first chamber 96 and a second chamber 98. The first member 88 of the piston 82 has a communication passage 100 communicating with the first chamber 96 and a space within the piston 82. The second member 90 has a communication passage 102 communicating with the space in the piston 82 and with the second chamber 98. Thus, the first and second chambers 96, 98 are normally held in communication with each other via the communication passages 100, 102 and the space within the piston 82. However, since the communication passage 100 has a relatively small diameter so that the passage 100 serves as a flow restrictor, there is developed a pressure differential between the first and second chambers 96, 98 when the brake fluid is caused to flow from the first chamber 96 toward the second chamber 98. This pressure differential will cause the piston 82 to move toward the second chamber 98 while forcing the valve member 78 against the biasing force of the spring 80, and to finally hold the valve member 78 seated on the valve seat 84. After the valve member 78 has been seated on the valve seat 84, the first member 88 of the piston 82 is further moved toward the second chamber 98 while compressing the spring 92, until the bottom of the cup-shaped first member 88 abuts on the corresponding end of the second member 90. In this arrangement, the second member 90 is able to hold the valve member 78 seated on the valve seat 84 even when the fluid pressure in the first chamber 96 is periodically or cyclically lowered due to pressure pulsation of the fluid pumped out by the pump 56 as in a piston pump. By such periodic variation in the pressure in the first chamber 96, only the first member 88 of the piston 82 is moved back away from the second member 90, but the second member 90 will not be retracted. As is apparent from the foregoing description, the selector valve 22 serves as a shut-off valve for the master cylinder 10.

The reservoir 38 has a housing 130 in which is formed an air chamber consisting of a large-diameter bore 132 and a small-diameter bore 134 communicating with the bore 132. Within this air chamber, there is slidably received a stepped-diameter piston 140 which consists of a large-diameter portion 136 and a small-diameter portion 138. The piston 140 is moved in the air chamber by a limited distance. An O-ring 142 fitted on the large-diameter portion 136 maintains fluid tightness between the stepped-diameter piston 140 and the housing 130, whereby a space within the housing 130 is divided into a fluid chamber 144 and an air chamber 146.

The reservoir housing 130 is formed with a valve hole 148 which is open at its one end to the fluid chamber 144 and concentric with the fluid chamber 144. A valve spool 150 is slidably and fluid-tightly fitted in the valve hold 148. The end of the valve spool 150 on the side of the fluid chamber 144 extends into a hole 152 formed in the stepped-diameter piston 140. An end portion of the large-diameter portion 136 of the piston 140 which defines an open end of the hole 142, has a radially inwardly extending flange assigned to serve as an engagement portion 154. This radially inward flange or engagement portion 154 is adapted to abut on a mating engagement portion 156 of the valve spool 150, which extends radially outwardly from the end of the spool 150 located within the hole 152. The engagement portions 154, 156 are spaced from each other along the axis of the valve spool 150 by a predetermined distance while the valve spool 150 is held in contacting relation with the bottom of the hole 152. With the piston 140 moved toward the air chamber 146 by a predetermined distance, the engagement portion 154 comes into abutment on the engagement portion 156, thereby enabling the valve spool 150 and the piston 140 to move as a unit.

The valve spool 150 has an axial bore 158 formed therethrough in the longitudinal direction, and two radial holes 160, 162 which extend radially from the axial bore 158. The radial holes 160 and 162 are spaced from each other by a suitable distance in the longitudinal direction of the valve spool 150. The radial hole 160 is normally held in communication with the fluid chamber 144 via the hole 152 in the piston 140. The housing 130 has an annular groove 164 in the inner surface of the valve hole 148, which annular groove 164 is aligned with the radial hole 162. The housing 130 is also provided with a port 166 which communicates with the radial hole 152 via the annular groove 164. The port 166 is connected to the previously indicated relief passage 64. The valve spool 150 and the stepped-diameter piston 140 are biased by a spring 168 disposed therebetween, in opposite directions away from each other. In the meantime, another spring 170 is disposed between the piston 140 and the housing 130, to bias the piston 140 toward the fluid chamber 144. Normally, the piston 140 abuts on the end of the valve spool 150 against a biasing action of the spring 168, and holds the valve spool 150 in abutting contact with a shoulder surface 172 of the housing 130 which is formed opposite to the other end of the valve spool 150. In this condition, the radial hole 162 communicates with the port 166 via the annular groove 164. This is the open position of the valve spool 150. The valve spool 150 is maintained at its open position by the spring 168 even when the piston 140 is moved toward the air chamber 146 as a result of an increase in the fluid pressure in the fluid chamber 144. However, if the stepped-diameter piston 140 is moved as a unit with the abuttment portions 154, 156 abutting on each other, the radial hole 162 becomes out of communication with the annular groove 164 formed in the housing 130, that is, the valve spool 150 is placed in its closed position.

The reservoir housing 130 further has a port 174 connected to the reservoir passage 36 and to the pump passage 58. The port 174 is kept in communication with the fluid chamber 144 via the axial bore 158, radial hole 160 and hole 152 in the piston 140.

The second relief valve 62, is disposed part way through the master-cylinder passage 26. The relief valve 62 has a housing 180 which has a relief valve chamber 182, a first port 184, a second port 186 and a third port 188. These three ports 184, 186, 188 communicate with the valve chamber 182. The first port 184 communicates with the pump passage 58 via the relief passage 66, and the second and third ports 186, 188 communicate with the master cylinder 10 and the selector valve 22, respectively. Thus, the housing 180 serves as a Tee-joint for connecting the master cylinder 10, pump 56 and selector valve 22 to each other. A relief valve seat 190 is formed adjacent to one end of the first port 184 on the side of the valve chamber 182. The valve chamber 182 accommodates a spherical relief valve member 192 which is adapted to be movable within the valve chamber 182 and seated on the valve seat 190. A relief valve piston 194 is slidably and fluid-tightly supported in the housing 180 such that the piston 194 is aligned with and opposite to the valve seat 190, with the valve member 192 disposed therebetween. The piston 194 is a stepped-diameter member consisting of a small-diameter portion on the side of the valve chamber 182, and a large-diameter portion. An O-ring 196 engaging the small-diameter portion of the piston 194 maintains fluid tightness between the valve chamber 182 and an air chamber 198 in which the large-diameter portion of the piston 194 is accommodated. The small-diameter portion projects into the valve chamber 182, and is axially movable in radially aligned relation with the center of the valve seat 190. The piston 194 is biased toward the valve seat 190 by biasing means in the form of a spring 200 which is disposed in the air chamber 198 so that it bears at its one end on the large-diameter portion of the piston 194 and at the other end of the bottom wall of the air chamber 198 on the side remote from the small-diameter portion. Thus, the valve member 192 is normally held seated on the valve seat 190, thereby closing the pump passage 66. Namely, the relief valve 62 is normally placed in its closed position.

The conditions for the relief valve 62 to be opened are represented by the following inequality (1):

$$Pp\, S1 > F + (S1-S2)\, Pm \qquad (1)$$

where,
Pp: Pressure in the pump passage 58
Pm: Pressure in the master cylinder 10
S1: Pressure-receiving area of the valve member 192 while it is seated on the valve seat 190
S2: Pressure-receiving area of the small-diameter portion of the piston 194
F: Biasing force of the spring 200

The inequality (1) is converted into the following inequality (2):

$$Pp > F/S1 + (1-S2/S1)\, Pm \qquad (2)$$

On the other hand, the following inequality (3) indicates the conditions for opening of an ordinary relief valve wherein the piston 194 is not provided and the biasing force of the spring 200 acts directly on the valve member 192:

$$Pp > F/S1 + Pm \qquad (3)$$

Comparing the inequality (2) with the inequality (3) reveals that the instant relief valve 62 is opened at a pressure which is lower than that of an ordinary relief valve by (S2/S1) Pm.

In the case where S1 is equal to S2, the conditions for the relief valve 62 to be open are expressed by the following inequality (4):

$$Pp > F/S1 \qquad (4)$$

This indicates that the pressure at which the relief valve 62 is open is not affected by the pressure in the master cylinder 10, but solely determined by the biasing force of the spring 200. To this end, the pressure-receiving areas S1 and S2 are determined to be equal to each other in the instant embodiment.

In the thus constructed hydraulic anti-skid braking system, the selector valve 22 normally holds the master-cylinder passage 26 and the intermediate passage 28 in fluid communication with each other, while the solenoid valve 24 holds the intermediate passage 28 and the brake-cylinder passage 30 in fluid communication with each other. In this normal condition, therefore, the master cylinder 10 is in communication with the brake cylinders 18, 20. Further, the stepped-diameter piston 140 of the reservoir 38 is located at its fully advanced position at which the volume of the fluid chamber 144 is a minimum, and the pump 56 is at rest. Of course, the first and second relief valves 60, 62 are in their closed position.

Upon depression of the brake pedal 12 in this condition, the pressurized brake fluid is delivered from the master cylinder 10 to the wheel brake cylinders 18, 20 through the master-cylinder passage 26, selector valve 22, intermediate passage 28, solenoid valve 24 and brake-cylinder passage 30. As a result, a brake is applied to the rear wheels 14, 16, whereby the vehicle speed is reduced. As long as the amount of depression of the brake pedal 14 is held relatively small in relation to the coefficient of friction of the road surface, the rear wheels 14, 16 will not undergo such a slip on the road surface that will cause a trouble. Therefore, the controller 70 will not change the operating position of the solenoid valve 24. Namely, the anti-skid pressure control is not effected.

When the amount of depression of the brake pedal 12 is relatively large in relation to the coefficient of friction of the road surface, the rear wheels 14, 16 will slip on the road surface in an amount beyond a permissible upper limit. This excessive amount of slip of the rear wheels 14, 16 is detected by the controller 70 by means of the speed sensors 72, and the controller 70 commands the solenoid valve 24 to change its operating position, i.e., the solenoid valve 24 is switched from its PRESSURE RISE position to its PRESSURE HOLD or PRESSURE DROP position. Further, the controller 70 turns on the pump motor 76.

With the solenoid valve 24 switched into its PRESSURE DROP position, the brake fluid is discharged from the brake cylinders 18, 20 to the reservoir 38, and thus the pressure in the brake cylinders 18, 20 is reduced. The brake fluid stored in the reservoir 38 is pumped by the pump 56 and fed to the selector valve 22. Due to a throttling or flow restricting effect of the communication passage 100, a pressure differential is developed between the first and second chambers 96 and 98. This pressure differential causes the piston 82 to be moved toward the second chamber 98, whereby the piston 82 forces the valve member 78 against the valve seat 84. Consequently, the brake fluid fed by the pump 56 is blocked from flowing toward the master cylinder 10 via the master-cylinder passage 26. Since the intermediate passage 28 is currently closed by the solenoid valve 24, the brake fluid pumped by the pump 56 opens the first relief valve 60 and is fed into the reservoir 38 via the relief passage 64.

With the braking pressure in the brake cylinders 18, 20 lowered as described above, the braking force exerted to the drive wheels 14, 16 is reduced and consequently the amount of slip of the wheels 14, 16 is reduced. As a result, the controller 70 receiving the SPEED signals from the speed sensors 72 detects this fact, and commands the solenoid valve 24 to be switched from its PRESSURE DROP position to its PRESSURE HOLD or PRESSURE RISE position.

When the solenoid valve 24 is put into its PRESSURE RISE position for communication of the intermediate passage 28 with the brake-cylinder passage 30, the brake fluid in the second chamber 98 is fed into the brake cylinders 18, 20, and the fluid pressure acting on the valve member 78 toward the valve seat 84 is reduced. At the same time, however, the reduction in the pressure in the second chamber 98 will result in a force which causes the piston 82 to force the valve member 78 against the valve seat 84. Therefore, the valve member 78 will not be moved away from the valve seat 84 through the fluid pressure in the master-cylinder passage 26 works on the valve member 78. In other words, the reduction in the pressure in the second chamber 98 will cause a pressure differential between the first and second chambers 96, 98 by means of a flow restricting effect on the restrictor passage 100. This pressure differential causes the piston 82 to force the valve member 78 against the valve seat 84.

In the above-described manner, the brake fluid from the pump 56 is fed into the brake cylinders 18, 20, and the braking pressure in the brake cylinders 18, 20 is elevated to increase the braking force applied to the drive wheels 14, 16. If the braking force is increased to such a level that will cause the drive wheels 14, 16 to slip in an amount exceeding the upper limit of an optimum range, the controller 70 detects this fact by means of the speed sensors 72, and the solenoid valve 24 is switched to its PRESSURE HOLD or PRESSURE DROP position. Subsequently, the above-indicated steps of operations are repeated to control the braking pressure in the brake cylinders 18, 20, so that the slip of the drive wheels 14, 16 on the road surface is held around the optimum level. Thus, the vehicle is efficiently braked and stopped, without sacrificing the driving stability or safety.

When the vehicle speed has been reduced to a desired level and the foot pressure on the brake pedal 12 is released, the controller 70 switches the solenoid valve 24 to its PRESSURE RISE position, thus cancelling the anti-skid pressure control function of the braking system. Since the pump 56 is continuously operated for a predetermined short time, the brake fluid fed from the reservoir 38 is returned to the master cylinder 10 via the selector valve 22, intermediate passage 28, solenoid valve 24, by-pass passage 32, check valve 34 and master-cylinder passage 26, if the brake fluid is left in the reservoir 38. Consequently, the reservoir 38 is brought to a state in which the volume of the fluid chamber 144 is a minimum.

As the brake fluid flows into the variable-volume fluid chamber 144 of the reservoir 38, the volume of the fluid chamber 144 is increased to a maximum level while the piston 140 is moved toward the air chamber 134. For easy understanding of the following description, the volume of the fluid chamber 144 when the engagement portions 154 and 156 abut on each other is referred to as "critical volume", and the position of the piston 140 corresponding to this critical volume is referred to as "intermediate position". After this intermediate position is reached, the piston 140 and the valve spool 150 are moved as a unit, until the maximum volume is reached.

The critical volume of the reservoir 38 may be reached, for example, if a leakage occurs in the solenoid valve 24 and the brake fluid flows into the reservoir 38 through the reservoir passage 36 while brakes are applied in a repeated fashion at braking pressures which are not so high as to trigger the anti-skid pressure control function. Even if the leakage fluid from the solenoid valve 24 does not fill the critical volume, the critical volume may easily be exceeded if the anti-skid pressure control function is triggered, which causes the brake fluid in the brake cylinders 18, 20 to be discharged and fed into the reservoir 38 via the solenoid valve 24. The critical volume of the reservoir 38 may also be reached if the coefficient of friction of the road surface is rapidly lowered during an anti-skid pressure control operation which has been triggered due to a relatively high friction coefficient of the road surface. Described in more detail, the braking pressure in the brake cylinders 18, 20 should be rapidly reduced when the coefficient of friction of the road surface is rapidly lowered. To this end, the solenoid valve 24 is brought into the PRESSURE DROP position, and a large quantity of the brake fluid is discharged from the brake cylinders 18, 20 and fed into the reservoir 38. As the reservoir 38 stores a certain amount of the brake fluid, the fluid from the brake cylinders 18, 20 will soon fill the critical volume.

When the fluid chamber 144 is increased to its critical volume which is smaller than the maximum volume by a predetermined volume, that is, when the stepped-diameter piston 140 has been moved to its intermediate position, the engagement portion 154 of the piston 140 abuts on the engagement portion 156 of the valve spool 150. Subsequently, the valve spool 150 and the piston 140 are moved as a unit toward the air chamber 146, whereby the radial hole 162 comes out of alignment with the annular groove 164. Thus, the valve spool 150 is placed in its closed position in which the relief passage 64 is disconnected from the fluid chamber 144. Hence, the brake fluid from the relief passage 64 will not flow into the fluid chamber 144. More specifically, the piston 140 in the intermediate position will not be moved toward the air chamber 146 by the brake fluid which is fed via the pump passage 58, relief valve 60 and relief passage 64. However, the piston 140 may be moved toward the air chamber 146 by a flow of the brake fluid from the reservoir passage 36, until the stroke end is reached, i.e., until the maximum volume of the fluid chamber 144 is reached. Accordingly, the brake fluid discharged from the brake cylinders 18, 20 may be accommodated in the reservoir 38 (fluid chamber 144) when the solenoid valve 24 is switched to the PRESSURE DROP position. Thus, the anti-skid pressure control may be achieved in the intended manner so as to control the braking pressure in the brake cylinders 18, 20.

In the case where the relief passage 64 is closed with respect to the reservoir 38 as indicated above, the pressure in the pump passage 58 becomes higher than usual. When the pressure in the pump passage 58 exceeds a preset level, the second relief valve 62 is brought into its open position in which the brake fluid may be returned to the master cylinder 10 via the relief passage 66 and the master-cylinder passage 26. In this connection, it is noted that the pressure receiving area S2 of the relief valve piston 194 is equal to the pressure receiving area S1 of the relief valve member 192, so that the master cylinder pressure in the valve chamber 182 has no effect on the pressure at which the relief valve 62 is opened. Stated the other way, the relief valve 62 is opened when the fluid pressure in the pump passage 58 (pressure applied to the relief valve member 192 via the relief passage 66 and the first port 184 of the releif valve 62) overcomes the biasing force of the spring 200. Because the master cylinder pressure has no influence on the pressure at which the relief valve 62 is opened, the pump 56, selector valve 22, solenoid valve 24 and other components need not be designed for withstanding the master cylinder pressure, but for withstanding a lower pressure at which the relief valve 62 is opened. Accordingly, these components in the anti-skid pressure control device may be constructed with a comparatively lower strength, and thus be reduced in weight. While the brake fluid is returned to the master cylinder 10 through the open relief valve 62 and the master-cylinder passage 26, the pressure of this fluid is comparatively low, which means a reduced magnitude of the "kick-back" phenomenon of the brake pedal 12 which occurs upon return flow of the fluid into the master cylinder 10.

For easy understanding, the foregoing description is baed on the assumption that the valve spool 150 is moved by the fluid pressure to its fully closed position in which the communication between the relief passage 64 and the fluid chamber 144 is completely lost. Practically, however, it is possible that the valve spool 150 is located at a position in which the radial hole 162 and the annular groove 164 only partially communicate with each other, giving a certain degree of restriction of a flow of the fluid from the relief passage 64 into the fluid chamber 144. In this instance, the pressure in the pump passage 58 is accordingly increased, and the relief valve 62 is opened, whereby the fluid delivered by the pump 56 is partially returned into the master cylinder 10. Thus, there is a possibility that the flow restricting partial communication between the relief passage 64 with the fluid chamber 144 prevents the fluid chamber 144 from accommodating the fluid from the relief passage 64, beyond its critical volume.

While the illustrated hydraulic braking system uses the relief valve 60 disposed between the pump passage 58 and the reservoir 38, it is possible that the relief valve 60 be connected between the intermediate passage 28 and the reservoir 38. In this case, there always exists a flow of the brake fluid through the selector valve 22 as long as the fluid is delivered from the pump 56. That is, the restricted flow of the fluid through the communication passage 100 causes the piston 82 to be held in the advanced position, thus maintaining the valve member 78 seated on the valve seat 84. Therefore, the connection of the relief valve 60 between the intermediate passage 28 and the reservoir 38 assures more secure protection of the valve member 78 from being moved away from the valve seat 84.

Although the relief valve 62 is effectively used in the illustrated embodiment of the anti-skid pressure control device without an accumulator and using a relatively small reservoir capacity, a similar relief valve may also be used in other types of anti-skid pressure control device which use an accumulator in the pump passage. In such types of anti-skid pressure control device, leakage flows from any valves might fill the reservoir and the accumulator and make it impossible to bleed the brake cylinders. The use of the relief valve is effective in preventing such inconveniences.

The illustrated relief valve 62 is disposed in the master-cylinder passage 26 such that the fluid from the master cylinder 10 is fed to the selector valve 22 via the second port 186, valve chamber 182 and third port 188. However, this connection of the relief valve 62 to the master cylinder 10 and to the selector valve 22 is not essential. It is possible, for example, that the master cylinder 10 and the selector valve 22 are connected by the master-cylinder passage 26, while the relief valve 62 is connected at its second port 186 to the master cylinder 10 by another passage.

Figure 2:
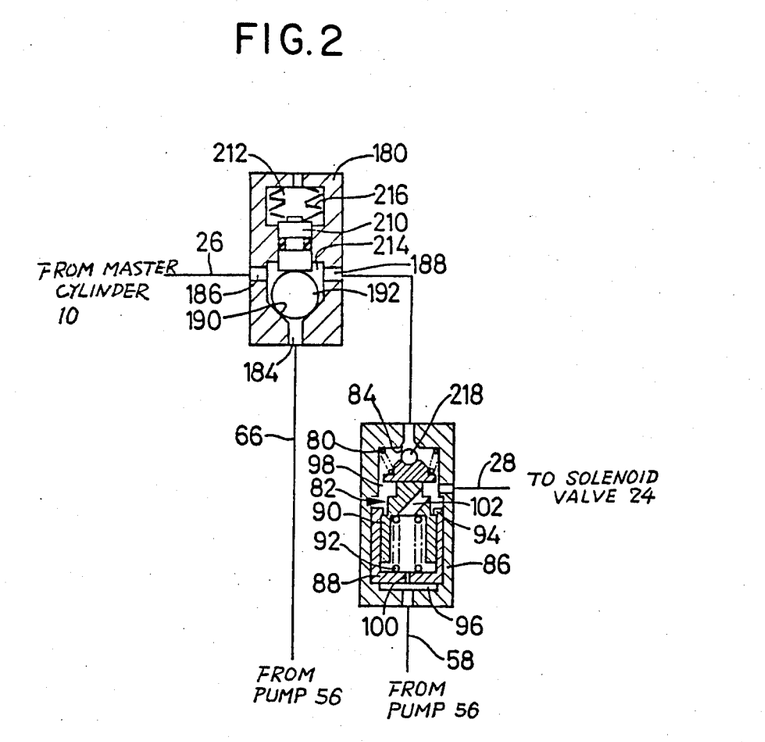
FIG. 2 is a front elevational view in cross section of another embodiment of the invention.

While the piston 194 of the relief valve 62 is a stepped-diameter member, the piston 194 may be replaced by a simple columnar piston 210 as shown in FIG. 2. This piston 210 is biased toward a valve chamber 214 by a coned disc or Belleville spring 216 disposed in an atmospheric pressure chamber 212. The atmospheric pressure chamber 212 may be open to the atmosphere or commnicates with a reservoir which feeds the master cylinder 10 with the brake fluid. In either case, the piston 212 receives at its one end a fluid pressure in the valve chamber 214, and at its other end the atmospheric pressure. The biasing means for biasing the piston 210 toward the valve member 192 may be a spring other than a coned disc spring 216.

Although the illustrated braking system of FIG. 1 uses the selector valve 22 as a shut-off valve for the master cylinder 10, in combination with the relief valve 62, it is possible to use a shut-off valve as shown in Fig. 2, in place of the selector valve 22. This shut-off valve does not have a valve seat corresponding to the valve seat 82 of the selector valve 22, and is adapted to merely close the master-cylinder passage 26 with a valve member 218 while the brake fluid is fed from the pump passage 58. In this arrangement, however, the master cylinder pressure during an anti-skid pressure control is applied to the relief valve 60. Hence, it is necessary that the preset opening pressure of the relief valve 60 be higher than the expected maximum master cylinder pressure, and that a check valve be provided between the shut-off valve and the relief valve 60 in order to block the master cylinder pressure. Other parts of the arrangement of FIG. 2 are identical to those of the braking system of FIG. 1, and their detailed description will not be provided. The same reference numerals are used in FIGS. 1 and 2 to identify the corresponding parts.

While the present invention has been described in detail in its preferred embodiments, it is to be understood that the invention is not confined to the illustrated arrangement which uses the selector valve 22, solenoid valve 24, reservoir 38, etc.; but the invention may be otherwise embodied, provided the anti-skid pressure control device permits the brake fluid delivered from a pump to be returned to a master cylinder while a brake is applied.

It will be obvious that other changes, modifications and improvements may occur to those skilled in the art, in view of the foregoing teaching, without departing from the scope of the invention defined in the appended claims.

What is claimed is:

1. An anti-skid pressure control device of a hydraulic braking system for an automotive vehicle, the system having a master cylinder, a brake cylinder, and a primary fluid passage connecting the master cylinder and the brake cylinder to feed a brake fluid from the master cylinder to the brake cylinder to apply a brake to a drive wheel of the vehicle, comprising:

a reservoir for storing the brake fluid discharged from a brake cylinder to reduce a braking pressure in the brake cylinder;

a solenoid valve disposed in said primary fluid passage and selectively placed in one of a first position for communication of the brake cylinder with the master cylinder, and a second position for communication of the brake cylinder with the reservoir, the solenoid valve being switched between said first and second positions under the control of a controller to control a level of a braking pressure in the brake cylinder;

a pump for pumping the brake fluid from the reservoir and delivering the pumped fluid via a pump passage to the primary fluid passage at a point thereof between the master cylinder and the solenoid valve; and a shut-off valve disposed in a portion of the primary fluid passage between the master cylinder and said point, said shut-off valve being closed to prevent a flow of the brake fluid therethrough in a direction from the pump toward the master cylinder at least in a condition where the brake fluid is fed via the pump passage to the shut-off valve, wherein the improvement comprises:

a relief valve for returning the brake fluid from said pump passage to said master cylinder when a pressure in said pump passage is higher than a preset level, said relief valve including: (a) a relief valve housing having a valve chamber, a first port communicating with said valve chamber and said pump passage, and a secord port communicating with said valve chamber and said master cylinder; (b) a valve seat formed so as to define a part of said valve chamber in direct communication with said first port; (c) a valve member accommodated in said valve chamber such that the valve member may be seated on said valve seat so as to prevent communication between the first port and the second port; (d) a relief valve piston slidably and fluid-tightly supported in said relief valve housing, such that the relief valve piston is opposite to said valve seat, with said valve member disposed therebetween, said relief valve piston being exposed at one end thereof to pressure in said valve chamber and at the other end to atmospheric pressure; and (e) relief valve biasing means for biasing said relief valve piston in a direction in which said relief valve piston abuts said relief valve member for forcing the relief valve member against said valve seat.

2. An anti-skid pressure control device according to claim 1, wherein a pressure receiving area of said valve member of the relief valve while the valve member is seated on said valve seat is equal to that of said relief valve piston.

3. An anti-skid pressure control device according to claim 1, wherein said other end of said relief valve piston has a portion having a larger diameter than other portions thereof, one end of said relief valve biasing means bearing on said other end of the relief valve piston.

4. An anti-skid pressure control device according to claim 1, wherein an axis of said relief valve piston is aligned with a center of said valve seat.

5. An anti-skid pressure control device of a hydraulic braking system for an automotive vehicle, having a master cylinder, a brake cylinder, and a primary fluid passage connecting the master cylinder and the brake cylinder to feed a brake fluid from the master cylinder to the brake cylinder to apply a brake to a drive wheel of the vehicle, comprising:

a reservoir for storing the brake fluid discharged from a brake cylinder to reduce a braking pressure in the brake cylinder;

a solenoid valve disposed in said primary fluid passage and selectively placed in one of a first position for communication of the brake cylinder with the master cylinder, and a second position for communication of the brake cylinder with the reservoir, the solenoid valve being switched between said first and second positions under the control of a controller to control a level of a braking pressure in the brake cylinder;

a pump for pumping the brake fluid from the reservoir and returning the pumped fluid via a pump passage to the primary fluid passage at a point thereof between the master cylinder and the solenoid valve;

a shut-off valve disposed in a portion of the primary fluid passage between the master cylinder and said point, said shut-off valve being closed to prevent a flow of the brake fluid therethrough in a direction from the pump toward the master cylinder at least in a condition where the brake fluid is fed via the pump passage to the shut-off valve; and a relief valve for returning the brake fluid from said pump passage to said master cylinder when a pressure in said pump passage is higher than a preset level, said relief valve including: (a) a relief valve housing having a valve chamber, a first port communicating with said valve chamber and said pump passage, and a second port communicating with said valve chamber and said master cylinder; (b) a valve seat formed so as to define a part of said valve chamber adjacent to said first port; (c) a valve member accommodated in said valve chamber such that the valve member may be seated on said valve seat; (d) a relief valve piston slidably and fluid-tightly supported in said relief valve housing, such that the relief valve piston is opposite to said valve seat, with said valve member disposed therebetween, said relief valve piston receiving at one end thereof a pressure in said valve chamber, and at the other end an atmospheric pressure; and (e) relief valve biasing means for biasing said relief valve piston in a direction in which said relief valve piston abuts on said relief valve member for forcing the relief valve member against said valve seat;

wherein said relief valve housing further has a third port communicating with said second port and said shut-off valve, whereby said relief valve housing serves as a Tee-joint for connecting said master cylinder, said pump passage and said shutoff valve.

6. An anti-skid pressure control device of a hydraulic braking system for an automotive vehicle, having a master cylinder, a brake cylinder, and a primary fluid passage connecting the master cylinder and the brake cylinder to feed a brake fluid from the master cylinder to the brake cylinder to apply a brake to a drive wheel of the vehicle, comprising:

a reservoir for storing the brake fluid discharged from a brake cylinder to reduce a braking pressure in the brake cylinder;

a solenoid valve disposed in said primary fluid passage and selectively placed in one of a first position for communication of the brake cylinder with the master cylinder, and a second position for communication of the brake cylinder with the reservoir, the solenoid valve being switched between said first and second positions under the control of a controller to control a level of a braking pressure in the brake cylinder;

a pump for pumping the brake fluid from the reservoir and returning the pumped fluid via a pump passage to the primary fluid passage at a point thereof between the master cylinder and the solenoid valve;

a shut-off valve disposed in a portion of the primary fluid passage between the master cylinder and said point, said shut-off valve being closed to prevent a flow of the brake fluid therethrough in a direction from the pump toward the master cylinder at least in a condition where the brake fluid is fed via the pump passage to the shut-off valve; and a relief valve for returning the brake fluid from said pump passage to said master cylinder when a pressure in said pump passage is higher than a preset level, said relief valve including: (a) a relief valve housing having a valve chamber, a first port communicating with said valve chamber and said pump passage, and a second port communicating with said valve chamber and said master cylinder; (b) a valve seat formed so as to define a part of said valve chamber adjacent to said first port; (c) a valve member accommodated in said valve chamber such that the valve member may be seated on said valve seat; (d) a relief valve piston slidably and fluid-tightly supported in said relief valve housing, such that the relief valve piston is opposite to said valve seat, with said valve member disposed therebetween, said relief valve piston receiving at one end thereof a pressure in said valve chamber, and at the other end an atmospheric pressure; and (e) relief valve biasing means for biasing said relief valve piston in a direction in which said relief valve piston abuts on said relief valve member for forcing the relief valve member against said valve seat;

wherein said reservoir comprises:

a reservoir housing;

a reservoir piston fluid-tightly received in said reservoir housing slidably movable over a predetermined distance, and cooperating with said reservoir housing to define a fluid chamber of a variable volume in which the brake fluid is stored, the volume of said fluid chamber being increased to a maximum volume when said reservoir piston is moved in one direction;

a valve spool slidably fitted in a valve hole formed in said reservoir housing, said valve spool being movable parallel to a line of movement of said reservoir piston, between an open position in which said fluid chamber is in communication with said pump passage, and a closed position in which said fluid chamber is disconnected from said pump passage; and spool biasing means for biasing said valve spool toward said open position, in a direction opposite to said one direction of movement of said reservoir piston, said reservoir piston having a first engagement portion, and said valve spool having a second engagement portion which engages said first engagement portion when said reservoir piston has been moved to an intermediate position at which the volume of said fluid chamber is smaller by a predetermined amount than said maximum volume, said valve spool being moved toward said closed position together with said reservoir piston after said reservoir piston has been moved to said intermediate position.

* * * * *

UNITED STATES PATENT AND TRADEMARK OFFICE
CERTIFICATE OF CORRECTION

PATENT NO. : 4,703,979
DATED : 3 November 1987          Page 1 of 2
INVENTOR(S) : N. NAKANISHI et al.

It is certified that error appears in the above-identified patent and that said Letters Patent is hereby corrected as shown below:

| Column No. | Line No. | Correction/Change From |
|---|---|---|
| ABSTR. | 14 | change "firstport" to --first port--. |
| 1 | 63 | change "not" to --no--. |
| 3 | 9 | change "flud" to --fluid--. |
| 3 | 63 | between "connected" and "the" insert --to-- |
| 4 | 65 | change "has" to --have--. |
| 5 | 9 | change "movably" to --movable--. |
| 5 | 61 | change "aplied" to --applied--. |
| 7 | 42 | change "intermidiate" to --intermediate--. |
| 7 | 51 | change "80" to --90--. |
| 8 | 52 | change "hold" to --hole--. |
| 9 | 15 | change "152" to --162--. |
| 10 | 11 | after "end" change "of" to --on--. |
| 10 | 12 | change "botom" to --bottom--. |
| 12 | 3 | change "through" to --though--. |
| 13 | 58 | change "releif" to --relief--. |

UNITED STATES PATENT AND TRADEMARK OFFICE
CERTIFICATE OF CORRECTION

PATENT NO. : 4,703,979

DATED : 3 November 1987

INVENTOR(S) : N. NAKANISHI et al.

Page 2 of 2

It is certified that error appears in the above-identified patent and that said Letters Patent is hereby corrected as shown below:

| Column No. | Line No. | Correction/Change From |
|---|---|---|
| 14 | 9 | change "baed" to --based--. |
| 14 | 30 | after "60" insert --could--. |
| 15 | 3 | change "commnicates" to --communicate--. |

Signed and Sealed this

Twenty-sixth Day of April, 1988

Attest:

DONALD J. QUIGG

Attesting Officer

Commissioner of Patents and Trademarks